(12) United States Patent
Huang et al.

(10) Patent No.: US 7,401,217 B2
(45) Date of Patent: Jul. 15, 2008

(54) SECURE ROUTING PROTOCOL FOR AN AD HOC NETWORK USING ONE-WAY/ONE-TIME HASH FUNCTIONS

(75) Inventors: Qiang Huang, Princeton, NJ (US); Johnas I. Cukier, Shrewsbury, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 706 days.

(21) Appl. No.: 10/639,575

(22) Filed: Aug. 12, 2003

(65) Prior Publication Data

US 2005/0036616 A1    Feb. 17, 2005

(51) Int. Cl.
*H04L 9/00* (2006.01)
(52) U.S. Cl. .................. 713/153; 713/168; 713/161
(58) Field of Classification Search .................. 380/270
See application file for complete search history.

(56) References Cited

U.S. PATENT DOCUMENTS

2003/0149874 A1* 8/2003 Balfanz et al. .............. 713/168

OTHER PUBLICATIONS

Reiter et al.; "Crowds: anonymity for Web transactions"; Nov. 1998; ACM Transactions on Information and System Security; vol. 1, issue 1; pp. 66-92.*
David B. Johnson and David A. Maltz, "Dynamic Source Routing in Ad Hoc Wireless Networks", in *Mobile Computing*, edited by Tomasz Imielinski and Hank Korth, chapter 5, pp. 153-181. Kluwer Academic Publishers, 1996.
Perkins et al., "Ad hoc On-Demand Distance Vector Routing," Proceedings of the 2nd IEEE Workshop on Mobile Computing Systems and Applications, pp. 90-100, Feb. 1999.
Perlman, "Network Layer Protocols with Byzantine Robustness," Ph.D. thesis, MIT LCS TR-429, Oct. 1998.
"The Keyed-Hash Message Authentication Code (HMAC)," No. FIPS 198, National Institute for Standards and Technology (NIST), 2002.
Dahill et al., "A Secure Routing Protocol for Ad Hoc Networks," Technical Report UM-CS-2001-037, University of Massachusetts, Department of Computer Science, Aug. 2001.
Zapata et al., "Secure Ad hoc On-Demand Distancec Vector Routing," ACM Mobile Computing and Communications Review (MC2R), vol. 6, No. 3, pp. 106-107, Jul. 2002.

(Continued)

*Primary Examiner*—Gilberto Barron, Jr.
*Assistant Examiner*—Jung Kim
(74) *Attorney, Agent, or Firm*—Dirk Brinkman; Clifton D. Mueller; Gene V. Vinokur

(57) ABSTRACT

A method authenticates packets that are transmitted serially in a network. A current password is selected for a current packet to be transmitted. The current packet includes current data. A one-way/one-time hash function is applied to the current password to form a current tag. A next password is selected for a next packet that includes next data, and the one-way/one-time hash function is applied to the next password to form a next tag. The one-way/one-time hash function is then applied to the next data, the next tag, and the current password to obtain a hashed value. The current packet is then transmitted to include the hash value, the current data, the current tag, and a previous password of a previous transmitted packet to authenticate the current data.

6 Claims, 8 Drawing Sheets

OTHER PUBLICATIONS

Lamport, "Password Authentication with Insecure Communication," Comm. of ACM, 24 (11), pp. 770-772, Nov. 1981.

Hauser et al., "Reducing the Cost of Security in Link State Routing," Symposium on Network and Distributed Systems Security, pp. 93-99, Feb. 1997.

Broch et al., "A performance comparisons of multi-hop wireless ad hoc network routing protocols," Proceedings of the Fourth Annual International Conference on Mobile Computing and Networking, pp. 85-97, 1998.

Diffie, et al. "New directions in cryptography," *IEEE Transactions on Information theory*, IT-22 (6) :644-654, Nov. 1976.

Ross Anderson, Francesco Bergadano, Bruno Crispo, Jong-Hyeon Lee, Charalampos Manifavas, Roger Needham, "A New Family of Authentication Protocols", *ACMOSR: ACM Operating Systems Review*, vol. 32, 1998.

P. Papadimitratos and Z.J. Haas, "Secure Routing for Mobile Ad Hoc Networks", in SCS Communication Networks and Distributed Systems Modeling and Simulation Conference, p. 27-31, Jan. 2002.

A. D. Wood, J. A. Stankovic, "Denial of Service in Sensor Networks", IEEE Computer Magazine, vol. 35, No. 10, Oct. 2002, pp. 54-62.

Yih-Chun Hu, Adrian Perrig, David B. Johnson, "Ariadne: A secure On-Demand Routing Protocol for Ad hoc Networks", MobiCom 2002, Sep. 23-28, 2002, Atlanta, Georgia, USA.

David B. Johnson, "Routing in Ad Hoc Networks of Mobile Hosts", in *Proceedings of the IEEE Workshops on Mobile Computing Systems and Applications* (WMCSA'94), pp. 158-163, Dec. 1994.

A. Perrig, R. Canetti, D. Song, and D. Tygar, "Efficient and Secure Source Authentication for Multicast," *In Network and Distributed System Security Symposium* (NDSS'01), Feb. 2001.

S. Cheung, "An Efficient Message Authentication Scheme for Link State Routing", in *13th Annual Computer Security Applications Conference*, pp. 90-98, 1997.

S. Marti, T. Giuli, K. Lai, and M. Baker, "Mitigating Routing Misbehavior in Mobile Ad Hoc Networks", in *the 6th ACM International Conference on Mobile Computing and Networking*, Aug. 2000.

B. Awerbuch, D. Holmer, C. Nita-Rotaru, H. Rubens, "An On-Demand Secure Routing Protocol Resilient to Byzantine Failures", in *Proceedings of the 2002 ACM Workshop on Wireless Security*, Atlanta GA, Sep. 2002.

A. Herzberg and S. Kutten, "Early Detection of Message Forwarding Faults", SIAM J. Comput., vol. 30, No. 4, pp. 1169-1196, 2000.

Ioannis C. Avramopoulos, Hisashi Kobayashi, and Randolph Y. Wang, "A Routing Protocol with Byzantine Robustness", *The 2003 IEEE Sarnoff Symposium*, Mar. 2003.

C. Perkins and E. Royer, "Ad-Hoc On-Demand Distance Vector Routing," in Proceedings of the 2nd IEEE Workshop on Mobile Computing Systems and Applications, 1999.

R. Rivest, A. Shamir, L. Adleman, "A method for obtaining Digital Signatures and Public Key Cryptosystems," Comm. of ACM, 21 (2), pp. 120-126, Feb. 1978.

Y. C. Hu, D. Johnson, and A. Perrig, "SEAD: Secure efficient distance vector routing for mobile wireless ad hoc networks", in Fourth IEEE Workshop and Mobile Computing Systems and Applications (WMCSA '02), Jun. 2002, pp. 3-3, Jun. 2002.

\* cited by examiner

310 — Source: Selects two random passwords $P_1$ and $P_2$
$RREQ_1 = \langle s_1, h(P_1), Sig(s_1, h(P_1)), h(s_2, h(P_2), P_1), dest\_addr, h_{SD} \rangle$
$s_1 = \langle source\_addr, broadcast\_id=1 \rangle, s_2 = \langle source\_addr, broadcast\_id=2 \rangle$
Intermediate node: Authenticate $s_1, h(P_1)$ by digital signature
store $\langle source\_addr, x_1 = h(P_1), x_2 = h(s_2, h(P_2), P_1) \rangle$ 320 — Source: Selects a random password $P_3$
$RREQ_2 = \langle s_2, h(P_2), P_1, h(s_3, h(P_3), P_2), dest\_addr, h_{SD} \rangle$
$s_3 = \langle source\_addr, broadcast\_id=3 \rangle$
Intermediate node: Check if $h(P_1) = x_1, h(s_2, h(P_2), P_1) = x_2$
store $\langle source\_addr, x_1 = h(P_2), x_2 = h(s_3, h(P_3), P_2) \rangle$ 330 — Source: Selects a random password $P_{k+1}$
$RREQ_k = \langle s_k, h(P_k), P_{k-1}, h(s_{k+1}, h(P_{k+1}), P_k), dest\_addr, h_{SD} \rangle$
$s_k = \langle source\_addr, broadcast\_id=k \rangle$
Intermediate node: Check if $h(P_{k-1}) = x_1, h(s_k, h(P_k), P_{k-1}) = x_2$
store $\langle source\_addr, x_1 = h(P_k), x_2 = h(s_{k+1}, h(P_{k+1}), P_k) \rangle$

*Fig. 3*

Source S: Selects a random password $P_{k+1}$

S->A: $RREQ_k = <s_k, h(P_k), P_{k-1}, h(s_{k+1}, h(P_{k+1}), P_k), dest\_addr, h_{SD}>$ $s_k = <source\_addr, broadcast\_id=k>, h_{SD} = HMAC_{K_{SD}}(s_k, dest\_addr)$

Node A: Check if $h(P_{k-1}) = x_1, h(s_k, h(P_k), P_{k-1}) = x_2$

Store $<source\_addr, x_1 = h(P_k), x_2 = h(s_{k+1}, h(P_{k+1}), P_k)>$

Calculate per-hop hash $h_{AD} = HMAC_{K_{AD}}(A, h_{SD})$

A->B: $RREQ_k = <s_k, h(P_k), P_{k-1}, h(s_{k+1}, h(P_{k+1}), P_k), dest\_addr, (A), h_{AD}>$

Node B: Check if $h(P_{k-1}) = x_1, h(s_k, h(P_k), P_{k-1}) = x_2$

Store $<source\_addr, x_1 = h(P_k), x_2 = h(s_{k+1}, h(P_{k+1}), P_k)>$

Calculate per-hop hash $h_{BD} = HMAC_{K_{BD}}(B, h_{AD})$

B->D: $RREQ_k = <s_k, h(P_k), P_{k-1}, h(s_{k+1}, h(P_{k+1}), P_k), dest\_addr, (A,B), h_{BD}>$

Destination D: Check if $h(P_{k-1}) = x_1, h(s_k, h(P_k), P_{k-1}) = x_2$

Store $<source\_addr, x_1 = h(P_k), x_2 = h(s_{k+1}, h(P_{k+1}), P_k)>$

Check if $HMAC_{K_{BD}}(B, HMAC_{K_{AD}}(A, HMAC_{K_{SD}}(s_k, dest\_addr))) = h_{BD}$

*Fig. 5*

$RREP = <\text{broadcast\_id}=j, (S, A, B, D), h_{DB}, h_{DA}, h_{DS}>.$

501

$h_{DB} = HMAC_{K_{BD}}(\text{broadcast\_id}=j, (S, A, B, D))$
$h_{DA} = HMAC_{K_{AD}}(\text{broadcast\_id}=j, (S, A, B, D))$
$h_{DS} = HMAC_{K_{SD}}(\text{broadcast\_id}=j, (S, A, B, D))$

To send a series of data packets $m_1, m_2, ..., m_n$

Source: Selects two random passwords $X_1$ and $X_2$
$MSG_1 = <m_1, h(X_1), Sig(m_1, h(X_1)), h(m_2, h(X_2), X_1)>$
Intermediate node: Authenticate $m_1, h(X_1)$ by digital signature
  store $<msg\_hash_1 = h(X_1), msg\_hash_2 = h(m_2, h(X_2), X_1)>$

Source: Selects a random password $X_3$
$MSG_2 = <m_2, h(X_2), X_1, h(m_3, h(X_3), X_2)>$
Intermediate node: Check if $h(X_1) = msg\_hash_1, h(m_2, h(X_2), X_1) = msg\_hash_2$
  store $<msg\_hash_1 = h(X_2), msg\_hash_2 = h(m_3, h(X_3), X_2)>$

Source: Selects a random password $X_{k+1}$
$MSG_k = <m_k, h(X_k), X_{k-1}, h(m_{k+1}, h(X_{k+1}), X_k)>$
Intermediate node: Check if $h(X_{k-1}) = msg\_hash_1, h(m_k, h(X_k), X_{k-1}) = msg\_hash_2$
  store $<msg\_hash_1 = h(X_k), msg\_hash_2 = h(m_{k+1}, h(X_{k+1}), X_k)>$

*Fig. 7*

Authenticate the acknowledgement sent by the destination node

Destination: Selects two random passwords $Y_1$ and $Y_2$
$<ACK_1, h(Y_1), Sig(ACK_1, h(Y_1)), h(ACK_2, h(Y_2), Y_1)>$
Intermediate node: Authenticate $ACK_1, h(Y_1)$ by digital signature
  store $<ack\_hash_1 = h(Y_1), ack\_hash_2 = h(ACK_2, h(Y_2), Y_1)>$

Source: Selects a random password $Y_3$
$<ACK_2, h(Y_2), Y_1, h(ACK_3, h(Y_3), Y_2)>$
Intermediate node: Check if $h(Y_1) = ack\_hash_1, h(ACK_2, h(Y_2), Y_1) = ack\_hash_2$
  store $<ack\_hash_1 = h(Y_2), ack\_hash_2 = h(ACK_3, h(Y_3), Y_2)>$

Source: Selects a random password $Y_{k+1}$
$<ACK_k, h(Y_k), Y_{k-1}, h(ACK_{k+1}, h(Y_{k+1}), Y_k)>$
Intermediate node: Check if $h(Y_{k-1}) = ack\_hash_1, h(ACK_k, h(Y_k), Y_{k-1}) = ack\_hash_2$
  store $<ack\_hash_1 = h(Y_k), ack\_hash_2 = h(ACK_{k+1}, h(Y_{k+1}), Y_k)>$

*Fig. 8*

SECURE ROUTING PROTOCOL FOR AN AD HOC NETWORK USING ONE-WAY/ONE-TIME HASH FUNCTIONS

FIELD OF THE INVENTION

The present invention relates to secure routing in wireless networks, and more particularly to authenticating packets in ad hoc networks.

BACKGROUND OF THE INVENTION

An hoc network is a collection of communication nodes that does not have the centralized administration of a conventional network. In addition, the topology of an ad hoc network changes frequently. Nodes enter and exit the network at will, and the nodes of the network provide dynamic routing. For example, an ad hoc, on demand, distance vector (AODV) protocol determines routes solely on-demand, see Perkins et al., "Ad hoc On-Demand Distance Vector Routing," Proceedings of the 2nd IEEE Workshop on Mobile Computing Systems and Applications, pp. 90-100, February 1999. Often, the nodes are mobile (wireless) and with limited resources.

Ad hoc environments introduce two main problems not commonly faced by traditional fixed network routing protocols. These are the lack of fixed infrastructure support and the frequent changes in network topology. Wireless ad hoc networks support dynamic communication environments and facilitate large-scale, real-time data processing in complex environments. Ad hoc networks require no fixed infrastructure, such as a base station or access points. Networks can be established inexpensively, as needed.

Typical applications for ad hoc networks include military command and control, search and rescue, sensor, and disaster relief, offices, college campuses, homes, mobile wireless data networks, and many other mission critical resource operations, in these and other vital or security/safety-sensitive deployments. Keeping the network available for its intended use is essential. Denial of service (DoS) attacks against such networks can compromise the health and safety of people.

At the physical level, wireless channels are susceptible to signal interference, jamming, tampering and eavesdropping. Defenses include spread spectrum modulation scheme, and routing around affected area. Attackers can also launch collision and exhaustion attacks in physical link layers, Wood et al., "Denial of Service in Sensor Networks," IEEE Computer Magazine, Vol. 35, No. 10, pp. 54-62, October 2002.

Desirable features of the AODV protocol are its low overhead in relatively static networks and loop free routing using destination sequence numbers. However, an on-demand route request (RREQ) usually introduces an initial delay. The protocol also suffers when there are many route requests, and when broadcast message authentication codes (MACs) are used.

The problem with many routing protocols for ad hoc networks is that those protocols are vulnerable to security attacks. The attacks can be classified as passive or active attacks. In a passive attack, a malicious node ignores operational requirements of the network. For example, an intermediate node along a route does not forward a packet, or hides routing information. Multiple routes and redundant messaging can alleviate passive attacks.

In an active attack, the malicious node introduces false information, e.g., a false distance vector, a false destination sequence, or a false route request. This confuses routing procedures and degrades network performance. With a false route, the malicious node can intercept and comprise packets.

Misdirecting is another active attack. Here, an intermediate node forwards packets along incorrect paths. This attack affects the source node by directing packets away from the intended destination node.

The AODV protocol uses destination sequence numbers to indicate how recently the routing information was generated. When multiple routes are available, the source node always selects a route associated with a largest destination sequence number.

A malicious node can fabricate a false large destination sequence number to attract traffic. Even worse, a deceived node can propagate, in good faith, a false route to other nodes to exacerbate the impact of the attack. In this case, the attacker can maliciously attract and discard data traffic.

A malicious node can also consume a large amount of the network bandwidth by broadcasting fictitious destination addresses to which no node can reply. This delays other traffic and can cause packets to be dropped, lowering overall network performance.

There are known techniques for minimizing 'Byzantine' failures caused by nodes that through malice or malfunction exhibit arbitrary behavior such as corrupting, forging, and delaying routing messages. A routing protocol is said to be Byzantine robust when it delivers any packet from a source node to a destination as long as there is at least one valid route, see Perlman, "Network Layer Protocols with Byzantine Robustness," Ph.D. thesis, MIT LCS TR-429, October 1998. However, the complexity of that protocol makes it unsuitable for ad hoc networks.

Papadimitrators et al., in "Secure Routing for Mobile Ad Hoc Networks," SCS Communication Networks and Distributed Systems Modeling and Simulation Conference, pp. 27-31, January 2002, describe a secure routing protocol (SRP) that prevents impersonation and replay attacks for on-demand routing. The protocol disables route caching and provides end-to-end authentication with an HMAC primitive, see "The Keyed-Hash Message Authentication Code (HMAC)," No. FIPS 198, National Institute for Standards and Technology (NIST), 2002. However, that protocol cannot prevent vicious request flooding because there is no mechanism for authenticating source and intermediate nodes.

Another technique uses hop-by-hop authentication. Every node is required to sign and authenticate every message. That increases processing requirements and the size of messages, see Dahill et al., "A Secure Routing Protocol for Ad Hoc Networks," Technical Report UM-CS-2001-037, University of Massachusetts, Department of Computer Science, August, 2001.

Another technique requires that each node has access to a certified public key of all network nodes to validate all routing packets, see Zapata et al., "Secure Ad hoc On-Demand Distance Vector Routing," ACM Mobile Computing and Communications Review (MC2R), Vol 6. No. 3, pp. 106-107, July 2002. The originator of a message appends an RSA signature, and a last element of a hash chain, i.e., a result of n consecutive hash calculations on a random number, Rivest et al., "A method for obtaining Digital Signatures and Public Key Cryptosystems," Comm. of ACM, 21 (2), pp. 120-126, February 1978, and Lamport, "Password Authentication with Insecure Communication," Comm. of ACM, 24 (11), pp. 770-772, November 1981.

As the message traverses the network, intermediate nodes can validate cryptographically the signature and the hash value, generate a $k^{th}$ element of the hash chain, with k being the number of traversed hops, and add the hash chain to the message, Lamport, "Constructing Digital Signature Based on a Conventional Encryption Function", SRI TR CSL 98, 1979.

However, public-key cryptography imposes a high processing overhead on the nodes and may be unrealistic for practical low-cost, ad hoc networks of low-complexity devices, such as sensors. Hash chaining requires that the nodes have synchronized clocks, see Cheung, "An Efficient Message Authentication Scheme for Link State Routing", in 13th Annual Computer Security Applications Conference, pages 90-98, 1997. However, that technique can only discover attacks long after they happened.

Hauser et al. avoid that defect by using hash chains to reveal the status of specific links in a link-state algorithm, see Hauser et al., "Reducing the Cost of Security in Link State Routing," Symposium on Network and Distributed Systems Security, pp. 93-99, February 1997. Their method also requires synchronization of the nodes.

Another technique uses a node-unique hash chain that is divided into segments. The segments are used to authenticate hop counts, Hu et al., "SEAD: Secure efficient distance vector routing for mobile wireless ad hoc networks," Fourth IEEE Workshop on Mobile Computing Systems and Applications (WMCSA '02), page 3, June 2002, Broch et al., "A performance comparison of multi-hop wireless ad hoc network routing protocols," Proceedings of the Fourth Annual International Conference on Mobile Computing and Networking, pp. 85-97, 1998. However, DSDV distributes routing information only periodically.

In many applications, reactive or on demand routing protocols are preferred. With on demand routing, source nodes request routes only as needed. On demand routing protocols performs better with significantly lower overhead than periodic routing protocols in many situations, Hu et al., "Ariadne: A secure On-Demand Routing Protocol for Ad hoc Networks", MobiCom 2002, September 2002. The authentication mechanism of Ariadne is based on TESLA, Perrig et al., "Efficient and Secure Source Authentication for Multicast," Network and Distributed System Security Symposium, February 2001. They use only efficient symmetric-key cryptographic primitives. The main drawback of that approach is the requirement of clock synchronization, which is very hard for wireless ad hoc networks.

Most secure routing protocols are based on authentication in the route discovery process. Some techniques detect faulty links based on observation of misbehavior during packet forwarding. Marti et al. describe a protocol for detecting and avoiding routers that drop or modify packets in ad hoc networks running DSR protocol, Marti et al., "Mitigating Routing Misbehavior in Mobile Ad Hoc Networks," $6^{th}$ ACM International Conference on Mobile Computing and Networking, August 2000. They have trusted nodes monitoring neighboring nodes. That technique does not work well in multi-rate wireless networks because nodes might be able to intercept packets forwarded with different modulations schemes. In addition, that method is vulnerable to collusion and misbehavior because there is no authentication.

Awerbuch, et al. use adaptive probing techniques, "An On-Demand Secure Routing Protocol Resilient to Byzantine Failures," Proceedings of the 2002 ACM Workshop on Wireless Security, September 2002. However, malicious nodes can differentiate probing packets from normal data packets, and therefore, can selectively forward the probing packets to avoid detection.

Herzberg et al., describe a combination of acknowledgements, timeouts and fault announcements, to detect packet forwarding faults, "Early Detection of Message Forwarding Faults," SIAM J. Comput., Vol. 30, no. 4, pp. 1169-1196, 2000. An implementation is described by Avramopoulos et al., "A Routing Protocol with Byzantine Robustness," The 2003 IEEE Sarnoff Symposium, March 2003. However, that protocol requires a separate authentication password for each of the intermediate router, thus adding more communication overhead when multi-hops are used.

A secure dynamic routing (SDR) protocol is entirely on demand, and uses two primary mechanisms, route discovery and route maintenance, Johnson, "Routing in Ad Hoc Networks of Mobile Hosts," Proceedings of the IEEE Workshop on Mobile Computing Systems and Applications, pp. 158-163, December 1994, Johnson et al., "Dynamic Source Routing in Ad Hoc Wireless Networks," Mobile Computing, Imielinski et al. (ed.) Chapter 5, pp. 153-181. Kluwer Academic Publishers, 1996.

When a source node has a packet to send to a destination node but does not have a route to that destination node, the source node broadcasts a route request (RREQ) packet. The packet specifies the destination and a unique RREQ broadcast identifier.

A receiving node attaches its own node address to a list in the RREQ and rebroadcast the RREQ. When the RREQ reaches the destination node, or any intermediate node that knows a route to the destination, that node sends a route reply (RREP) packet back to the source node, including an accumulated list of addresses from the source to the destination node. When the RREP reaches the source node, it stores the route in its route cache.

Route maintenance is a mechanism for detecting changes in the topology of the network that can make a stored route invalid. This is done with a route error packet.

SUMMARY OF THE INVENTION

A method authenticates packets that are transmitted serially in a network. A current password is selected for a current packet to be transmitted.

The current packet includes current data. A one-way/one-time hash function is applied to the current password to form a current tag. A next password is selected for a next packet that includes next data, and the one-way/one-time hash function is applied to the next password to form a next tag.

The one-way/one-time hash function is then applied to the next data, the next tag, and the current password to obtain a hashed value.

The current packet is then transmitted to include the hash value, the current data, the current tag, and a previous password of a previous transmitted packet to authenticate the current data.

BRIEF DESCRIPTION OF THE DRAWINGS

FIGS. 3 and 5 are a block diagrams of steps of a route discovery phase according to the invention;

FIG. 6 is a block diagram of a route reply message according to the invention;

FIG. 7 is a block diagram of steps of a packet forwarding phase according to the invention; and FIG. 8 is a block diagram of steps of a fault detection phase according to the invention.

DETAILED DESCRIPTION OF THE PREFERRED EMBODIMENT

System Operation

Figure 1:
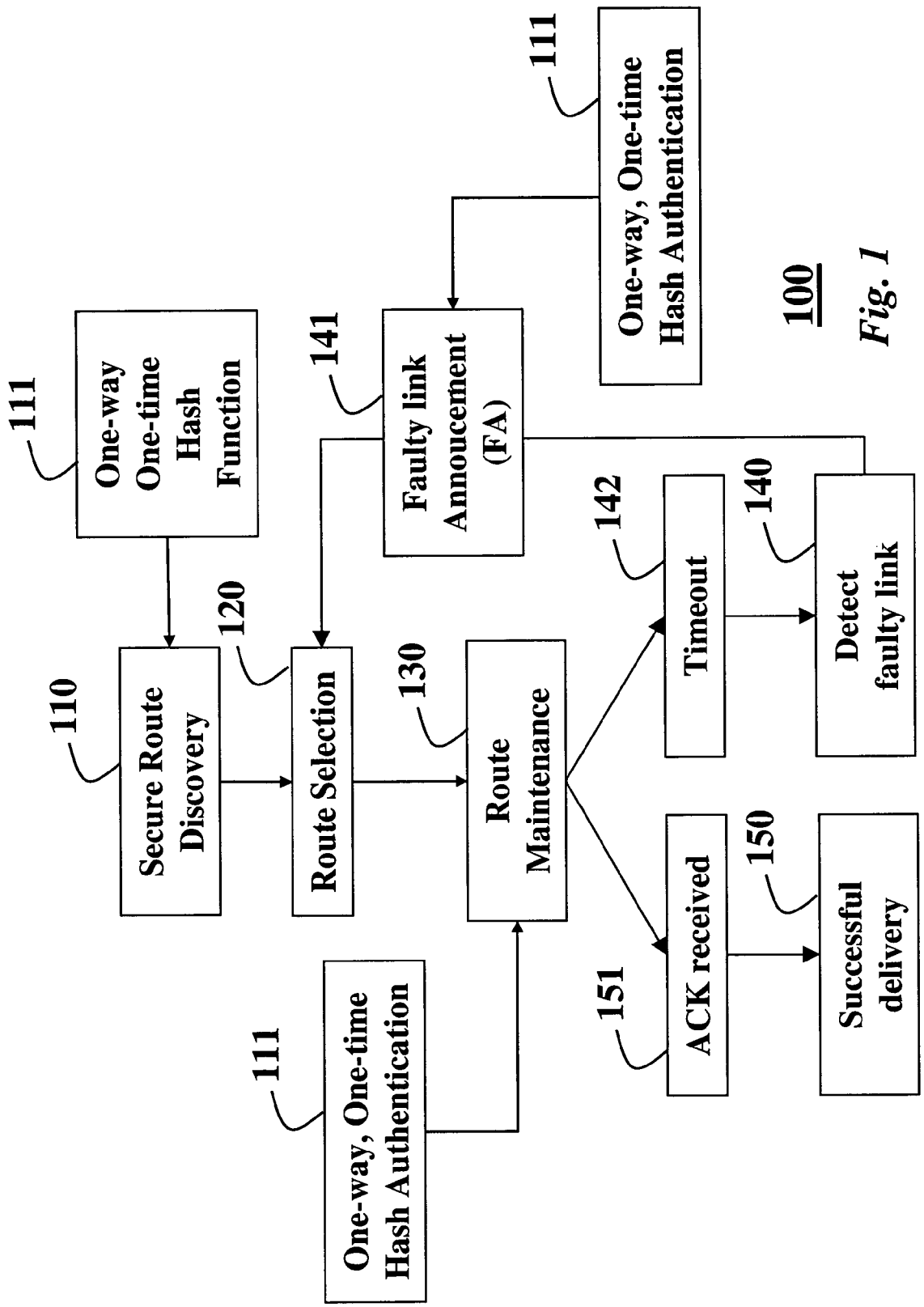
FIG. 1 is a flow diagram of a secure routing protocol according to the invention.

As shown in FIG. 1, our invention provides an authentication protocol 100 for a wireless ad hoc network where packets are transmitted serially. By serially, we mean a current packet $p_i$ is immediately preceded by a previous packet $p_{i-1}$, and followed immediately by a next packet $p_{i+1}$.

More particularly, during a route discovery phase 110, we provide secure route selection 120, i.e., a shortest intact route, that is, a route without any faulty links. During route maintenance phase 130, while packets are forwarded, we also detect 140 faulty links 141 based on a time out condition 142. Receiving an acknowledgement control packet 151 signals successful delivery 150 of a packet.

Guy Fawkes Protocol

For packet authentication, we use a one-way/one-time function 111 based on a protocol described by Ross et al., "A New Family of Authentication Protocols," ACMOSR: ACM Operating Systems Review, ACM Press, Vol. 32, pp. 9-20, October 1998, which is known as the Guy Fawkes Protocol. The hash function encodes a password to form a tag.

By one-way we mean that the password cannot be decoded from the tag, and by one-time we mean that the password is used only once, because part of its value lies in its publication after its use. We have adapted that protocol for use in an ad hoc network where multiple packets need to be sent sequentially. Therefore, if a number of packets are sent sequentially, the password needs to be refreshed each time. Thus, a single authentication is associated with a stream of future packets, rather than a stream of future events, as in prior art hash chains. In addition, the password must be known to authenticate a current packet, but not future packets.

As an advantage over prior art asymmetric digital signature or secret passwords do not need to be known ahead of time or distributed among the nodes after the system becomes operational. It should also be noted, that each password is used only one time, because the password is published to perform the authentication.

The one-way/one-time hash function as implemented by the invention is ideal for serially communicating packets along a route in an ad hoc network, without requiring the nodes to establish shared secret passwords beforehand.

Figure 2:
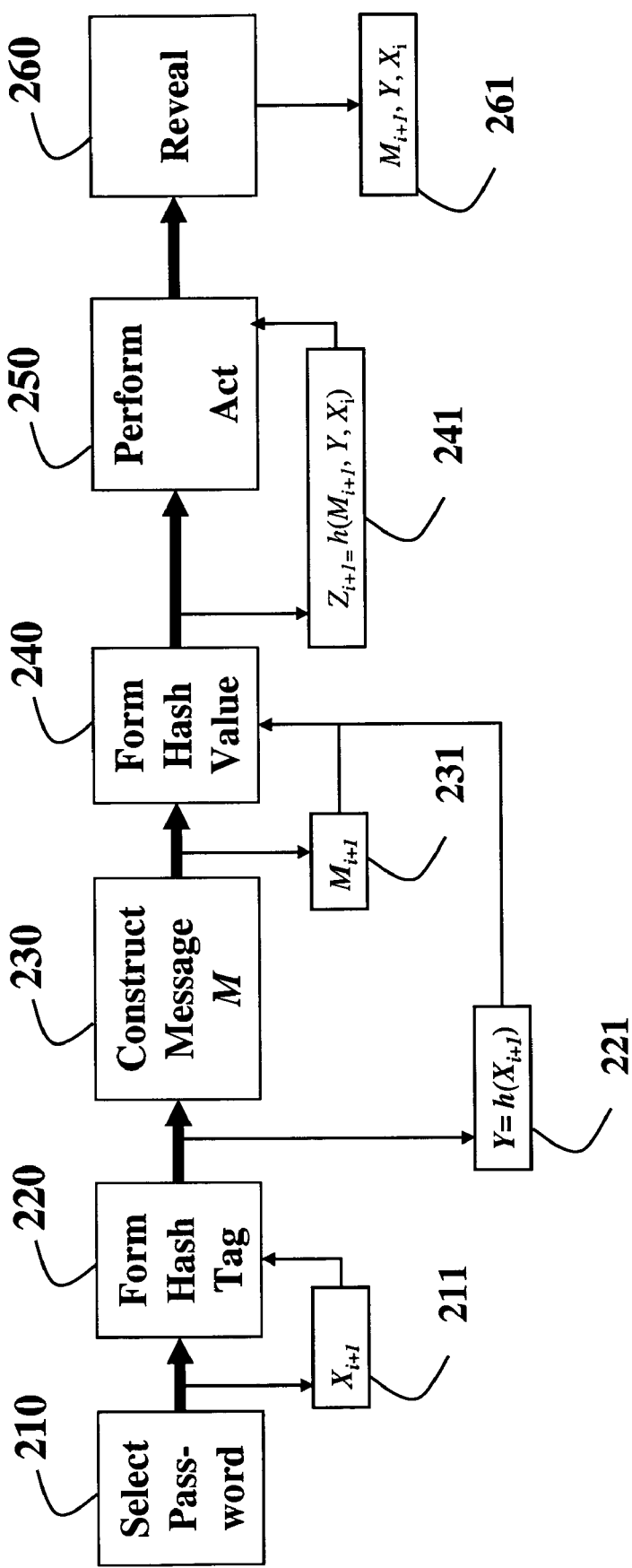
FIG. 2 is a flow diagram of steps of a one-way hash function used by the invention.

As shown in FIG. 2, the protocol 200 includes the following steps. Select 210 a random password $X_{i+1}$ 211. Form 220 a tag Y 221, $Y=h(X_{i+1})$, Construct 230 a message $M_{i+1}$ 231, e.g., "We are the free Jacobins, and we are blowing up the Houses of Parliament on November 5th. We will authenticate ourselves by the password that was hashed to form the tag Y." Form 240 a hash value $Z_{i+1}=h(M_{i+1}, Y, X_i)$ 241, and make it public. Perform the act 250 and reveal 260 Mi+1, Y, Xi 261 to authenticate the act.

We use the one-way/one-time hash function to authenticate a route request (RREQ) by a source node and broadcast identifier in the route discovery phase 110, and data control packets in the packet forwarding phase 130. Thus, we thwart malicious requests and replay attacks. We also use a per-hop hashing to verify that no intermediate hop is omitted in a node list describing a route. A route reply (RREP) is authenticated by a destination node and therefore, attackers cannot cheat other nodes by fabricating routing information.

Our authentication mechanism is different than prior art secure routing protocols based on digital signature, because only efficient symmetric key cryptography is used. Our method is also better than prior art hash chain based protocols, because a node stores only one password, while hash chain based protocols store multiple passwords, which increases memory requirements.

To 140 detect faulty links, we use acknowledgements 151, timeouts 142, and fault announcements 141, these can also be authenticated by our one-way/one-time hash function 111. Therefore, we need only a single authentication tag for each data and control packet, thereby decreasing network bandwidth and node memory requirements, compared to the protocol of Avramopoulos et al.

With faulty link detection, all passive and active attackers that fail to forward data packets, and that maliciously misdirect data packets are recognized and avoided in subsequent routings.

Protocol Description

Secure Route Discovery

In on demand routing protocols, e.g., DSR, a source node initiates route discovery 110 to find a route when the source node has a packet to send to a destination node, and the source node does not store a route to the destination node in its route cache. The source node does this by broadcasting a RREQ control packet to neighboring nodes. Neighboring nodes rebroadcast the request, until the request eventually finds it way to the destination node so that intermediate nodes on the route can be discovered. We authenticate the RREQ control packet with the one-way/one-time hash function 111.

RREQ Authentication

Figure 4:
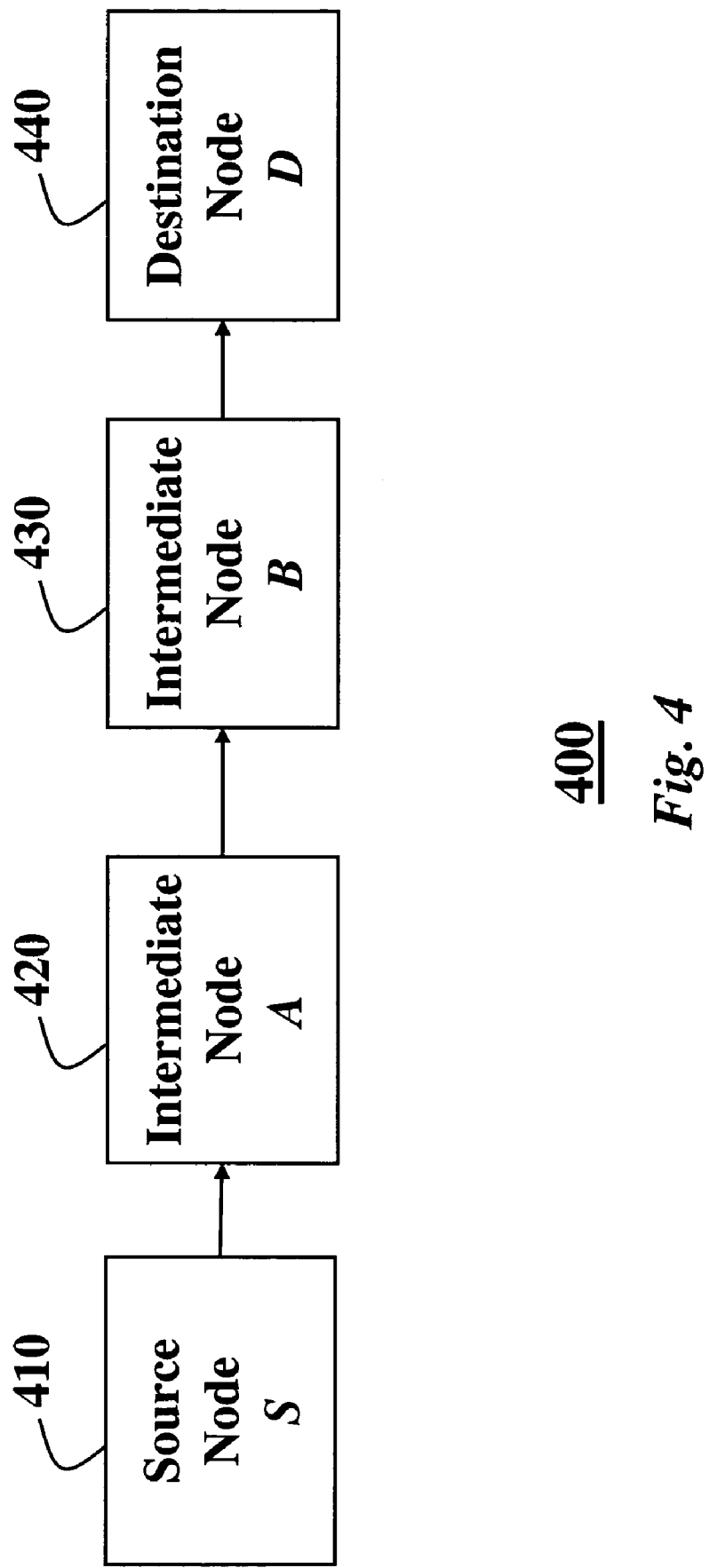
FIG. 4 is a block diagram of a route according to the invention.

FIG. 4 shows an example route of an ad hoc network 400, from a source node S 410, via intermediate nodes A 420 and B 430, to a destination node 440. In this type of control packet, the pertinent packet data are source and destination addresses that are to define the route.

As shown in FIGS. 3 and 5 for the route 400 shown in FIG. 4, the source node selects 310 two random passwords $P_1$ and $P_2$, and broadcasts a first RREQ:

$$RREQ_1 = \{s_1, h(P_1), Sig(s_1, h(P_1)), h(s_2, h(P_2), P_1), \text{des-t\_addr}, h_{SD}\}, \text{where}$$

$s_1$=<source_addr, broadcast_id=1>, and $s_2$=<source_addr, broadcast_id=2>, h is our one-way/one-time hash function, $Sig(s_1, h(P_1))$ is a digital signature to verify $(s_1, h(P_1))$ to other nodes, so that every intermediate node and the destination can verify that the (source_addr, broadcast_id, $h(P_1)$) in the $RREQ_1$ packet is valid and indeed generated by the claimed source node.

An intermediate node generates a route entry by storing the address of the source node S, broadcast_id=1, $x_1=h(P_1)$, and $x_2=h(s_2, h(P_2), P_1)$. These values can verify future route requests from the same source node. The component <source_addr, broadcast_id> uniquely identifies the RREQ. The value broadcast_id is incremented whenever the source node issues a new RREQ.

The value $h_{SD}=HMAC_{K_{SD}}(\text{source\_addr}, \text{dest\_addr}, \text{broadcast\_id})$ is a keyed-hash message authentication code (HMAC) to authenticate information to the destination node. The secret key $K_{SD}$ is shared by the source node and the destination node. This needs only be used for the first packet.

Because of the broadcast nature of the RREQ control packets, every node in the ad hoc network eventually receives the $RREQ_1$ after a time $m\Delta$, where m is a diameter of the network, and $\Delta$ is a maximum hop delay.

After a time interval $m\Delta$, the source node sends second route request $RREQ_2$. Therefore, the source node selects 320 a third random password $P_3$, and broadcasts $RREQ_2$:

$$RREQ_2 = \{s_2, h(P_2), P_1, h(s_3, h(P_3), P_2), \text{dest\_addr}, h_{SD}\}, \text{where}$$

$s_2$=<source_addr, broadcast_id=2>, and $s_3$=<source_addr, broadcast_id=3>. Each intermediate node verifies the source_addr and broadcast_id carried in the present RREQ packet. This can be repeated until a route is discovered.

The intermediate node finds the route entry associated with the claimed source node, and applies the hash function h to $P_1$, which was received in $RREQ_2$ and checks if the result is equal to $x_1$ previously received in $RREQ_1$, and stored in the route entry. If true, then $P_1$ is valid. Then, the intermediate node applies the hash function h to $(s_2,h(P_2),P_1)$ carried in $RREQ_2$, and checks if the result is the same as $x_2$ stored in the route entry. If this check also succeeds, the authenticity of $(s_2,h(P_2))$ is verified. Thus, the intermediate node is assured that the $RREQ_2$ is from the claimed source node and the present broadcast_id=2 is valid. The intermediate node then updates its routing entry by recording broadcast_id=2, $x_1=h(P_2)$ and $x_2=h(s_3,h(P_3),P_2)$, which are used to authenticate $RREQ_3$.

In general, before sending a $k^{th}$ route request $RREQ_k$, the source node waits a time interval $m\Delta$ after sending the previous request $RREQ_{k-1}$. Then, the source node selects 330 a new random password $P_{k+1}$, and broadcasts $RREQ_k$:

$$RREQ_k=\{s_k,h(P_k),P_{k-1},h(s_{k+1},h(P_{k+1}),P_k),\text{dest\_addr}, h_{SD}\}, \text{where}$$

$s_k$=<source_addr,broadcast_id=k>. Each intermediate node receives this $RREQ_k$. If the intermediate node stores broadcast_id equal to or greater than k from the source, then the intermediate node discards the request. Otherwise, the intermediate node verifies whether $x_1=h(P_{k-1})$ and $x_2=h(s_k,h(P_k),P_{k-1})$. If both tests are true, then the intermediate node updates the route entry, i.e., the packet data, associated with the claimed source node by recording broadcast_id=k, $x_1=h(P_k)$ and $x_2=h(s_{k+1},h(P_{k+1}),P_k)$. The intermediate node then appends its own address to the intermediate node list in the RREQ, performs the per-hop hashing, which is achieved by calculating a new hash tag by hashing its own address concatenated with the old hash tag, and replacing the old hash tag, as shown by $h_{SD},h_{AD},h_{BD}$ in FIG. 5, and rebroadcasts the RREQ. If any check fails, the RREQ is dropped.

Thus, with per-hop hashing, an attacker cannot delete an intermediate node from the node list, because the attacker does not have the secret password between the intermediate node and the destination node.

When the RREQ reaches the destination node, the destination node verifies it by checking if $$HMAC_{K_{BD}}(B,HMAC_{K_{AD}}(A,HMAC_{K_{SD}}(\text{source\_addr}, \text{dest\_addr,broadcast\_id})))=h_{BD}.$$

If the check succeeds, then the integrity of this RREQ is verified, along with the authenticity of its origin and every intermediate node along the path from node S to node D. The destination node then sends a RREP back to the source node, including an authenticated copy of the accumulated list of addresses from the RREQ, i.e., the packet data for the RREQ control packet.

As shown in FIG. 6, the RREP control packet contains the following fields: <broadcast_id, (S, A, B, D), $h_{DB}$, $h_{DA}$, $h_{DS}$>501, where broadcast_id is for the source S to verify the freshness of the reply, and the hash values 503 are $$h_{DS}=HMAC_{K_{SD}}(\text{broadcast\_id},(S, A, B, D));$$

$$h_{DA}=HMAC_{K_{AD}}(\text{broadcast\_id},(S, A, B, D)); \text{ and}$$

$$h_{DB}=HMAC_{K_{BD}}(\text{broadcast\_id},(S, A, B, D)).$$

As the RREP packet passes through intermediate nodes back to the source node, each node checks the corresponding authentication tag, and stores the route information in its route cache. The source node then selects 120 a shortest route to the destination node without previously detected faulty links.

Packet Forwarding and Detecting Faulty Links

FIG. 7 shows the steps for authenticating data packets forwarded from the source node to the destination node, along the selected route, while checking for faulty links. In DSR, the source route information is carried in each packet header.

The source node S has a sequence of data packets $\{m_1, m_2, \ldots m_n\}$ to send to the destination node D through a source route $\{S, n_1,n_2, \ldots n_L,D\}$, where $n_1,n_2, \ldots n_L$ are nodes along the route. When the source sends the first data packet $m_1$, the source node selects two random passwords $X_1$ and $X_2$, sets a timeout to receive either a destination acknowledgement (ACK) 151, see FIG. 1, or a faulty link announcement (FA) control packet 141, from a node along the route. The source node sends the following message to the first intermediate node along the route:

$$MSG_1=\{m_1,h(X_1),Sig(m_1,h(X_1)),h(m_2,h(X_2),X_1)\},$$

where, $Sig(m_1,h(X_1))$ is a signature over $(m_1,h(X_1))$. With the public key of the source node, every node along the route can verify that $(m_1,h(X_1))$ is valid and is indeed generated by the source node.

An alternative way to authenticate $(m_1,h(X_1))$ is to use authentication tags when the source node shares a pair-wise secret key with each node along the route. Each node generates a new route table entry for source node S by recording a. $<S, msg\_hash_1=h(X_1),msg\_hash_2=h(m_2,h(X_2),X_1)>,$ which is used to authenticate a future message $MSG_2$.

When sending the second data packet $m_2$, the source node selects another password $X_3$ and forwards the second message $MSG_2$ to the first downstream router: $MSG_2=\{m_2,h(X_2), X_1,h(m_3,h(X_3),X_2)\}$. Each node on the route verifies $(m_2,h(X_2))$ by first applying the hash function h to $X_1$ received in $MSG_2$ and checking if the result is the same value as msg_hash$_1$ in its route table. If true, then $X_1$ is valid. The node then performs the hash function on $(m_2,h(X_2),X_1)$ received in $MSG_2$, and checks if the result is equivalent to msg_hash$_2$. If the check succeeds, then the authenticity of $(m_2,h(X_2))$ is verified. The node then updates its routing entry by recording $<S, msg\_hash_1=h(X_2), msg\_hash_2=h(m_3,h(X_3),X_2)>$, and forwards the data packet to the node along the route as specified in the header of the packet header.

Similarly, when sending the $k^{th}$ ($k\geq 2$) packet $m_k$, the source node selects a next password $X_{k+1}$ and forwards the $k^{th}$ message $MSG_k$:

$$MSG_k=\{m_k,h(X_k),X_{k-1},h(m_{k+1},h(X_{k+1}),X_k)\}.$$

As shown in FIG. 8, an intermediate router authenticates a received data packet $m_k$ by checking if $h(X_{k-1})=msg\_hash_1$, and $h(m_k,h(X_k),X_{k-1})=msg\_hash_2$. If any of the checks fails, then the packet is dropped. If both checks succeed, then the node updates its routing entry associated with source S by $<S, msg\_hash_1=h(X_k), msg\_hash_2=h(m_{k+1},h(X_{k+1}),X_k)>$. Then, the data packet is forwarded to the next node along the route. When the packet is forwarded, each node sets a timeout to receive either the ACK 151 or the FA 141 for this data packet. Timeouts are set to a worst-case round trip time, which is known to every node in the ad hoc network.

If the check at node $n_i$ fails, then either $n_{i-1}$ or $h(m_2,h(X_2), X_1)$ in $MSG_1$ has been modified, or node $n_{i-1}$ modified $(m_2, h(X_2),X_1)$ in $MSG_2$. In either case, the current node $n_i$ drops the packet. Consequently, node $n_{i-1}$ does not receive a valid ACK after time out, and the node can report a faulty link error $(n_{i-1}, n_i)$, or the node $n_{i-2}$ reports a fault in the link $(n_{i-2}, n_{i-1})$ to the source node. In either case, the fault link includes the malicious node $n_{i-1}$.

The authentication tag of each packet according to the invention only has two hashes and one password, while in the prior art detection protocol introduced required L authentication tags for a route with L hops. Therefore, our method has a lower communication and storage overhead.

When the destination node receives the data packet $m_k$, it verifies the authenticity of the packet in the same way as the intermediate nodes. If any of the checks fails, then the packet is dropped. If both checks succeed, the packet is delivered successfully 150, and schedules the ACK 151 for transmission along the reverse of path of the route. The ACK reflects the packet identification number k.

The destination node also appends an authentication tag to the ACK message for the nodes on the reverse path. The authentication tag bears the same structure as the one generated by the source node. Specifically, when sending $ACK_1$, for the first packet $m_1$, the destination node randomly selects two passwords $Y_1$ and $Y_2$, and sends the following information: $ACK_1, h(Y_1), Sig(ACK_1, h(Y_1)), h(ACK_2, h(Y_2), Y_1)$. Similarly, $Sig(ACK_1, h(Y_1))$ is used to verify $(ACK_1, h(Y_1))$ by each node along the reverse path of the route. When sending the acknowledgement for packet $m_k$ ($k \geq 2$), the destination selects a new password $Y_{k+1}$ and forwards: $ACK_k, h(Y_k), Y_{k-1}, h(ACK_{k+1}, h(Y_{k+1}), Y_k)$, as shown in FIG. 8.

If the timeout at an intermediate node expires, then that node sends the FA 141 with an identification number according to our hash function for authentication of the FA by the upstream nodes. When a node receives the ACK, the node verifies its authenticity and that a timeout is pending for the corresponding data packet. If the ACK is not authentic or a timeout is not pending, the node discards the ACK. Otherwise, the node cancels the timeout and forwards the ACK to the next node.

When a node receives the FA, it verifies its authenticity, and that a timeout is pending for the corresponding data packet, and that the link reported in the FA is the first downstream to the node that generated the FA. If the FA is not authentic, or a timeout is not pending, or the link is not the downstream to the node reporting the FA, then the node drops the FA. Otherwise, the node cancels the timeout and further forwards the FA control packet.

If the timeout expires at the source node, then the source node deletes the first link on the route from its route cache. The source node then finds a new route to the destination node reprocesses the "failed" packet as if the failed packed is a new packet. If the source node receives an $ACK_k$, then the source node knows there was a successful delivery of the data packet $m_k$. If the source receives an authentic FA, then the source node deletes the associated link from its route cache, provided that this is the same link of the node that generated the FA, and finds a new route.

With our protocol, message $MSG_{k-1}$ is always received before message $MSG_k$. This is because all packets are forwarded along the same route in DSR. In the case of congestion and buffering, the messages are stored in a first-in-first-out buffer according to the order that they are received.

When the source node wants to use another path to the destination node, the source node selects a new password and authenticates the password with every node along the new route, and reinitiate the entire process, as described above.

Elaborating on Individual Components

We assume that each node has a memory buffer large enough to ensure that normal packets are never dropped because of congestion. Authentication ensures that the buffer is properly allocated to valid packets. Buffers also protect against traditional DoS, in which malicious nodes flood the network with unauthenticated packets. Malicious nodes that send packets frequently could otherwise quickly consume all allocated buffer space.

EFFECT OF THE INVENTION

With packet authentication according to the invention, passive and active attackers can be detected because a malicious node does not have the secret password to be used by the destination node. Neither can a malicious node fabricate an ACK with a valid authentication tag.

The one-way/one-time hash tag according to the invention also safeguards against a replay attack. In a replay attack, an intermediate node stores authentic packets and introduces them into the network at a later time to "take out" new packets. With our protocol, each new packet is sent with a new and different password so that a check on a replayed password fails when an intermediate node compares the hash of the password with the hash value it received in a previous message. The ACKs provide feedback on whether a packet was successfully delivered, or not.

Timeouts detect delivery failures. The combined use of source routing, ACKs, authentication, buffers, FIFO scheduling, and a timeout, is sufficient to identify whether a route is faulty. Time-outs at every intermediate node, in combination with FAs, provide feedback on faulty links as well. This is helpful for network management purposes and also aids the route selection process.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for authenticating packets transmitted serially in an ad hoc network, comprising:

selecting a current password $P_i$ for a current packet to be transmitted, the current packet including current data $M_i$;

applying a one-way/one-time hash function h to the current password $P_i$ to form a current tag $Y_i$ of the current packet as $Y_i = h(P_i)$;

selecting a next password $P_{i+1}$ for a next packet to be transmitted, the next packet including next data $M_{i+1}$;

applying the one-way/one-time hash function h to the next password $P_{i+1}$ to form a next tag $Y_{i+1}$ of the next packet as $Y_{i+1} = h(P_{i+1})$;

applying the one-way/one-time hash function h to the next data $M_{i+1}$ the next tag $Y_{i+1}$, and the current password $P_i$ of the current packet to obtain $Z_{i+1} = h(M_{i+1}, Y_{i+1}, P_i)$; and transmitting, in an ad hoc network, the current packet from a source node to a destination node via intermediate nodes along a route including multiple hops, the current packet including $Z_{i+1}$, the current data $M_i$, the current tag $Y_i$, and a previous password $P_{i-1}$ of a previously transmitted packet to authenticate the current data $M_i$, in which the transmitting further comprises:

maintaining, in a route cache in each node along the route, a node list describing the route through the ad hoc network; and applying the one-way/one-time hash function h on a per hop basis along the route to verify that no intermediate hop is omitted in a node list.

2. The method of claim 1, in which a first password of a first packet is authenticated with a digital signature at the source node and the intermediate nodes.

3. The method of claim 1, in which the plurality of packets include control packets and the data are route requests for discovering a route in the ad hoc network.

4. The method of claim 3, in which the data include a source address and a destination address of the route.

5. The method of claim 1, in which the passwords are selected randomly by the source node and the intermediate nodes.

6. The method of claim 1, in which the plurality of packets include control packets and the data are route replies for a discovered route in the ad hoc network.

* * * * *